United States Patent
Elhardt et al.

(10) Patent No.: US 8,474,562 B2
(45) Date of Patent: Jul. 2, 2013

(54) TRACTOR CENTER CONTROL CONSOLE

(75) Inventors: Paul Michael Elhardt, Charlotte, NC (US); Marlin Lavon Goodnight, Martinez, GA (US); Nicholas Michael Toomey, Evans, GA (US)

(73) Assignee: Deere & Company, Moline, IL (US)

( * ) Notice: Subject to any disclaimer, the term of this patent is extended or adjusted under 35 U.S.C. 154(b) by 24 days.

(21) Appl. No.: 13/228,206

(22) Filed: Sep. 8, 2011

(65) Prior Publication Data
US 2013/0062904 A1    Mar. 14, 2013

(51) Int. Cl.
*B60K 37/00* (2006.01)
*B62D 49/00* (2006.01)

(52) U.S. Cl.
USPC ............. 180/89.12; 180/90; 180/900; 296/70

(58) Field of Classification Search
USPC ................ 180/69.2, 69.24, 78, 89.1, 89.12, 180/90, 315, 331, 900; 280/779; 74/492, 74/493; 296/1.08, 70, 181.8, 190.01, 190.08, 296/191, 192
See application file for complete search history.

(56) References Cited

U.S. PATENT DOCUMENTS

| | | | | |
|---|---|---|---|---|
| 2,304,365 A * | 12/1942 | McCormick | ................ | 180/68.5 |
| 3,003,573 A * | 10/1961 | Lorenz | ................ | 180/68.5 |
| 3,583,519 A * | 6/1971 | Meyer et al. | ................ | 180/90 |
| 3,789,945 A * | 2/1974 | Hansen | ................ | 180/69.2 |
| 3,985,380 A * | 10/1976 | Raivio | ................ | 292/69 |
| 4,126,202 A | 11/1978 | Hern | | |
| D256,018 S | 7/1980 | Stone et al. | | |
| 4,371,743 A * | 2/1983 | Decker | ................ | 174/535 |
| 4,372,410 A | 2/1983 | Loken et al. | | |
| 4,582,156 A | 4/1986 | Kochy et al. | | |
| 4,597,461 A | 7/1986 | Kochy et al. | | |
| 4,685,529 A * | 8/1987 | Tamura et al. | ................ | 180/89.12 |
| 5,624,142 A * | 4/1997 | Watson et al. | ................ | 292/241 |
| 5,725,065 A * | 3/1998 | Knurr et al. | ................ | 180/69.2 |
| 6,030,029 A * | 2/2000 | Tsuda et al. | ................ | 296/203.02 |
| 6,494,526 B2 | 12/2002 | Uno | | |
| 6,499,550 B2 * | 12/2002 | Matsuda et al. | ................ | 180/90 |
| 6,591,927 B1 | 7/2003 | Honekamp et al. | | |
| 6,626,256 B2 * | 9/2003 | Dennison et al. | ................ | 180/69.24 |
| 6,663,170 B1 * | 12/2003 | Miga | ................ | 296/190.08 |
| 6,709,041 B1 * | 3/2004 | Hotary et al. | ................ | 296/70 |
| 6,712,405 B2 * | 3/2004 | Desmarais et al. | ................ | 292/113 |
| 6,837,324 B2 * | 1/2005 | Nagai et al. | ................ | 180/68.3 |
| 7,464,783 B2 * | 12/2008 | Gray et al. | ................ | 180/89.17 |
| D594,885 S | 6/2009 | Kuwae et al. | | |
| 7,862,098 B2 * | 1/2011 | Biggs et al. | ................ | 296/37.8 |
| 8,128,121 B2 * | 3/2012 | Mitsuo et al. | ................ | 280/728.2 |
| 2007/0257461 A1 * | 11/2007 | Lutz | ................ | 280/89 |
| 2007/0272462 A1 * | 11/2007 | Yamamoto et al. | ................ | 180/90 |
| 2009/0101657 A1 * | 4/2009 | Matsumoto | ................ | 220/562 |
| 2009/0174214 A1 * | 7/2009 | Sato | ................ | 296/70 |
| 2009/0206627 A1 * | 8/2009 | Duplantis et al. | ................ | 296/72 |
| 2009/0236876 A1 * | 9/2009 | Sawai et al. | ................ | 296/193.11 |
| 2009/0301830 A1 * | 12/2009 | Kinsman et al. | ................ | 188/289 |
| 2009/0309338 A1 * | 12/2009 | Hillman | ................ | 280/728.3 |

* cited by examiner

FOREIGN PATENT DOCUMENTS

EP        466664 A1 *   1/1992

*Primary Examiner* — Joseph Rocca

(57) ABSTRACT

A tractor center control console may be assembled before being mounted on a tractor. The tractor center control console includes a one-piece molded plastic pedestal, an instrument panel, and a steering column assembly that is solely supported by the one-piece plastic pedestal. A removable cowl covers at least part of the one-piece plastic pedestal. Electronic components are housed in the one-piece plastic pedestal and covered by the removable cowl.

11 Claims, 5 Drawing Sheets

TRACTOR CENTER CONTROL CONSOLE

FIELD OF THE INVENTION

The present invention relates to a tractor center control console for supporting a steering column assembly and mounting electronic and mechanical components.

BACKGROUND OF THE INVENTION

Utility tractors may have center control support assemblies that include several support castings and brackets that are used to support and limit deflection of a steering column assembly in response to loads or impact forces. However, side-to-side or front-to-back deflection of a center control support assembly in response to a 250 pound load at 80 degrees C. may exceed 50 mm where a steering column assembly is mounted. A tractor center control console is needed that can withstand loads or impact forces to the steering column assembly, and limit or reduce deflection of the steering column assembly.

Center control support assemblies also may be used to mount other components such as an instrument panel, key switch panel, and hood hinge. Because of the relatively large number of parts, significant assembly time is required to build a center control support assembly in place on the tractor, and to attach components including heat shields and noise reduction materials. A tractor center control console is needed having a lower number of parts and shorter assembly time.

Utility tractors also may have electronic components such as controllers for the engine and/or transmission that must be connected via wiring harnesses to other components on the tractor. There is a need to mount electronic components on a tractor where they are accessible for service, optimize routing of wiring harnesses, and protect and shield the components from engine heat, moisture, and dirt.

SUMMARY OF THE INVENTION

A tractor center control console that may be assembled before being mounted on a tractor. The tractor center control console includes a one-piece molded plastic pedestal, an instrument panel, and a steering column assembly that is solely supported by the one-piece plastic pedestal. A removable cowl covers at least part of the one-piece plastic pedestal. Electronic components are housed in the one-piece plastic pedestal and covered by the removable cowl.

The tractor center control console can reduce or minimize deflection of the steering column assembly, and has a minimal number of parts and short assembly time. Additionally, the tractor center control console mounts electronic components where they are accessible for service, optimizes routing of wiring harnesses, and protects and shields the components from engine heat, moisture, and dirt.

DESCRIPTION OF THE PREFERRED EMBODIMENT

Figure 1:
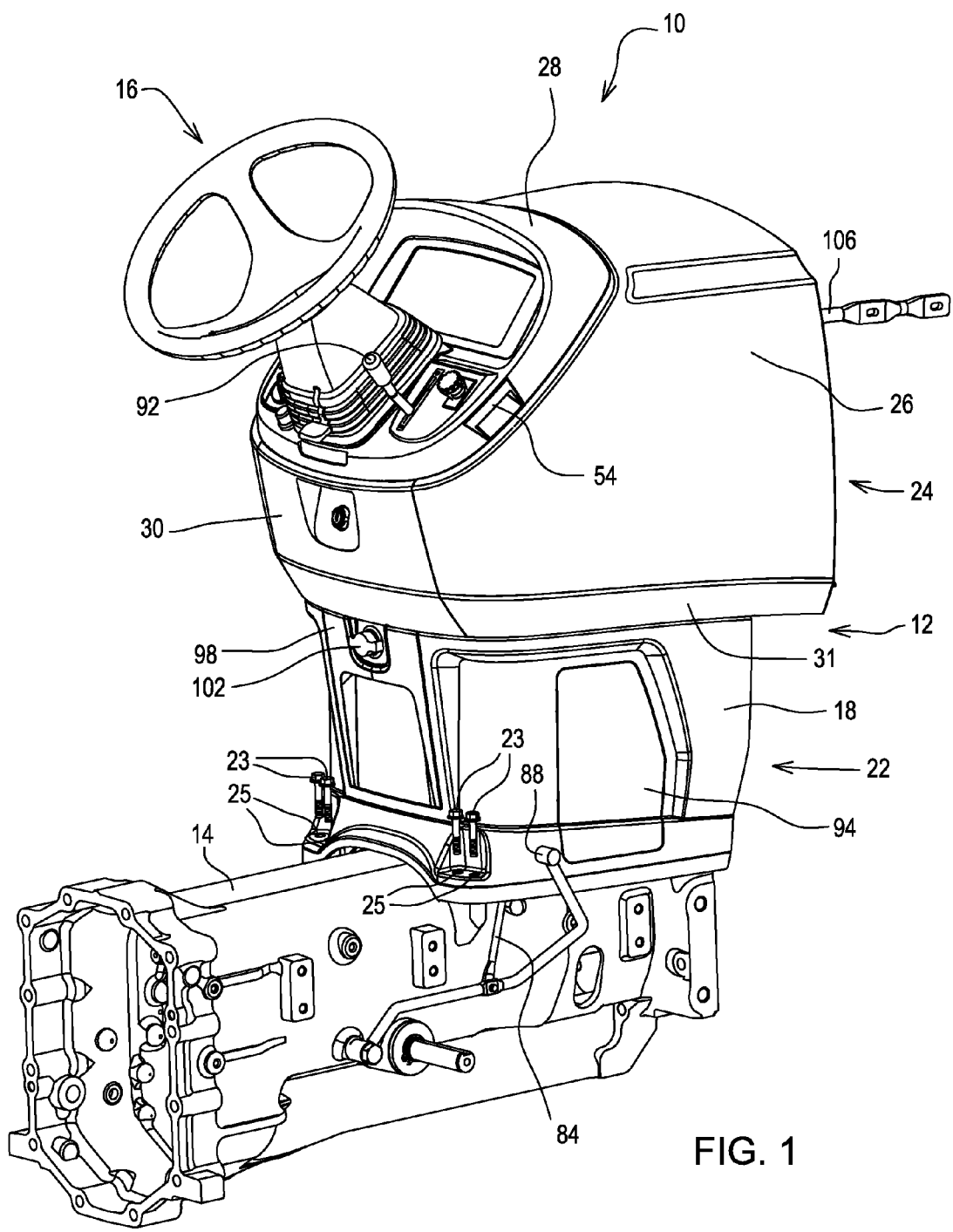
FIG. 1 is right front perspective view of a tractor center control console and transmission housing according to a first embodiment of the invention.

As shown in FIG. 1, in one embodiment, tractor center control console 10 may include one-piece plastic pedestal 12 mounted to transmission housing 14 of a utility tractor. One-piece plastic pedestal 12 may include pedestal base 22 which may be secured to the transmission (or alternatively, the frame or floor) of a utility tractor using threaded fasteners 23 through mounting holes 25, and pedestal head 24 supported by pedestal base 22. The one-piece plastic pedestal may be molded from a variety of different plastic materials having high strength and rigidity. A preferred plastic is 30% glass filled polypropylene with a blowing agent.

Figure 2:
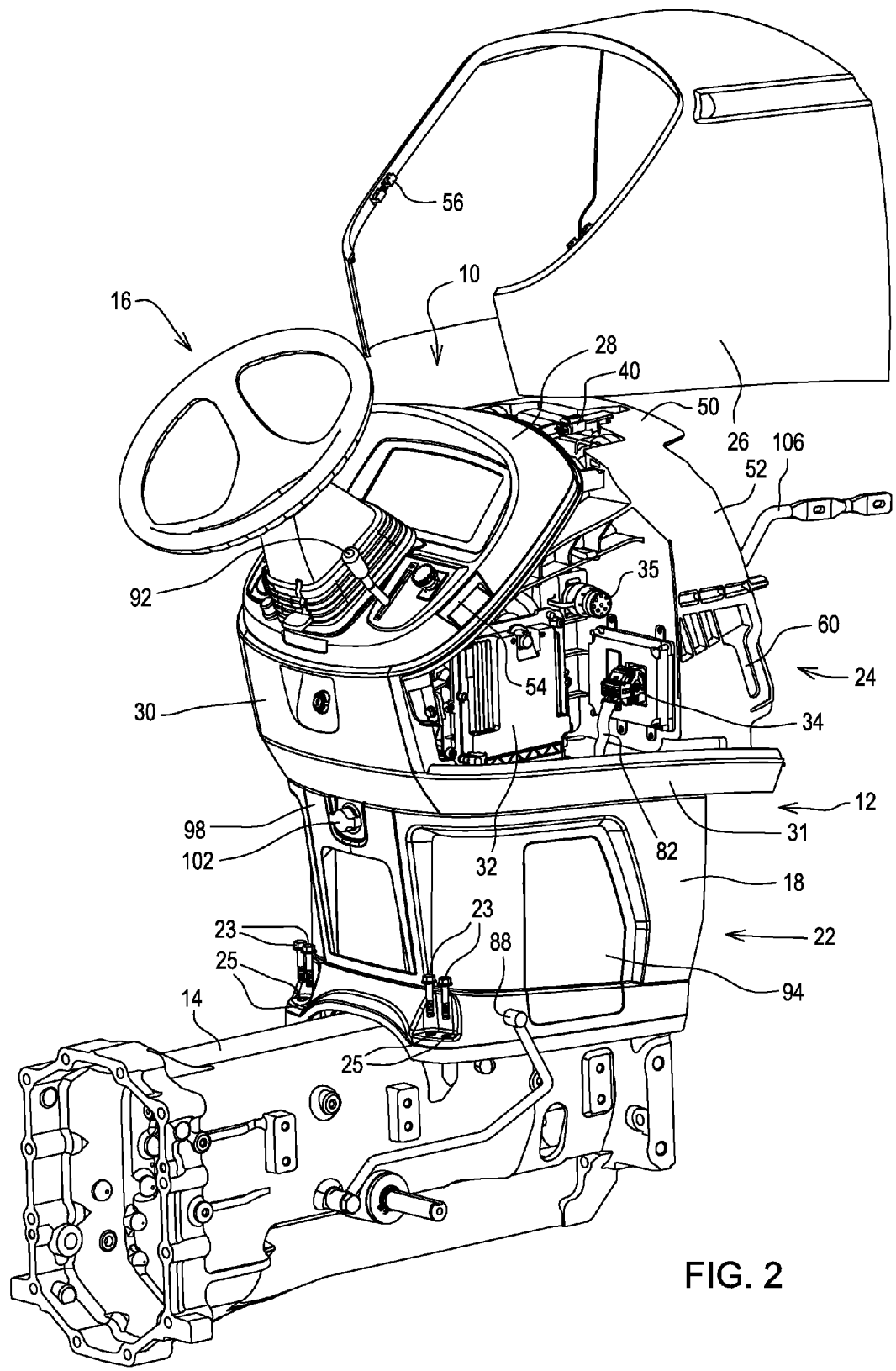
FIG. 2 is a right front perspective view of a tractor center control console and transmission housing, with the cowl removed, according to a first embodiment of the invention.

In one embodiment, the tractor center control console may include cowl 26 covering the top and sides of pedestal head 24. As shown in FIG. 2, cowl 26 may be removed from the pedestal head without tools by squeezing pull latches 54 on both sides of the instrument panel to disengage the pull latches from fasteners 56, and sliding the cowl upwardly until T-posts 58 disengage mounting tracks 60. Cowl 26 may rest on and may be supported by top and side surfaces 50, 52 of the pedestal head. Pull latches 54 may be spring biased to engage fasteners 56 on the sides of cowl 26. Additionally, T-posts 58 facing inwardly from the sides of the cowl may slide into and engage mounting tracks 60 on the sides of the pedestal head. The T-posts may engage or disengage the mounting tracks by sliding between the wider upper ends and the narrower lower ends of the mounting tracks.

Figure 4:
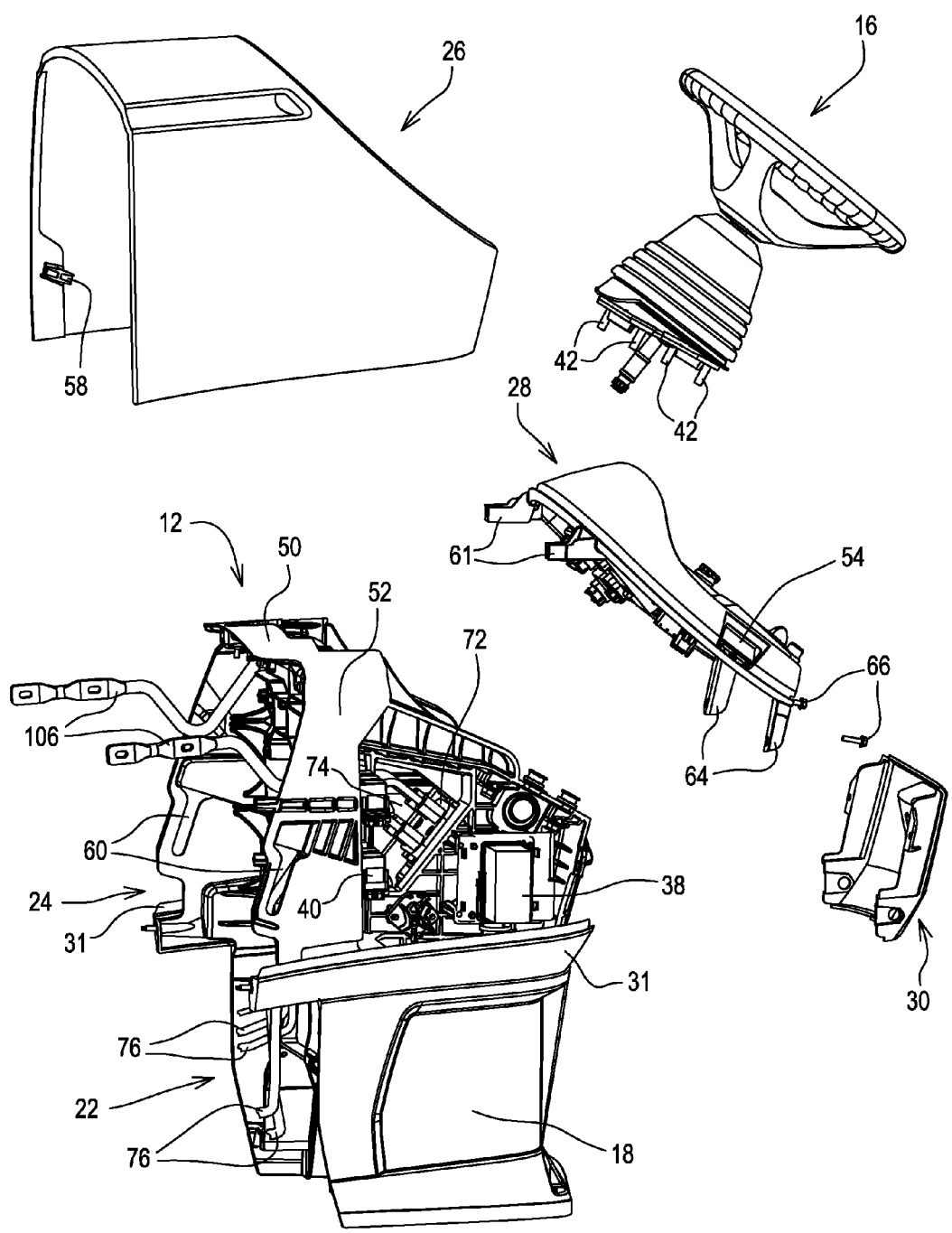
FIG. 4 is a partially exploded left front perspective view of a tractor center control console according to a first embodiment of the invention.

In one embodiment, once cowl 26 is removed from pedestal head 24, components mounted to the pedestal head and housed in pockets underneath the cowl may be easily accessed and serviced. For example, as shown in FIGS. 2 and 4, components mounted and housed in pockets in the pedestal head may include electronic engine control unit 32, electronic transmission control unit 34, electrical diagnostic port 35, fuse block 38 and DPF (diesel particulate filter) pressure switch 40, all of which may be mounted and housed in pockets in the pedestal head. An operator may remove cowl 26 without using tools to access, service or replace each of these components, and without removing any other components housed in the center control console assembly.

In one embodiment, one-piece plastic pedestal 12 may have outer walls 18 with a wall thickness between about 5 mm and about 7 mm, and support ribs 20 having a wall thickness between about 2 mm and about 3 mm. The outer walls and support ribs may form a honeycombed and ribbed support structure having a plurality of interior pockets. The tractor center control console may isolate the electronic and other components mounted in pockets in the pedestal from the heat, moisture, dirt or other contaminants in the engine compartment. The outer walls 18 and supporting ribs 20 of the one-piece plastic pedestal also may provide a protective barrier and shield to block noise and vibration between the engine compartment and components mounted in the pedestal.

In one embodiment, the one-piece plastic pedestal may provide the sole support structure for steering column assembly 16 which is mounted thereto. The steering column assembly may be mounted to the pedestal head at a position at least about 0.5 meters above the tractor transmission, floor or frame. The outer walls and supporting ribs of the one-piece plastic pedestal may be configured to minimize deflection of the steering column assembly without use of support castings, brackets or other additional support structures. Where the steering column assembly is mounted to the pedestal head, side-to-side and/or front-to-back deflection of the one-piece plastic pedestal may be limited to not more than about 20 mm in response to a load of 250 pounds (at 80 degrees C.).

Figure 3:
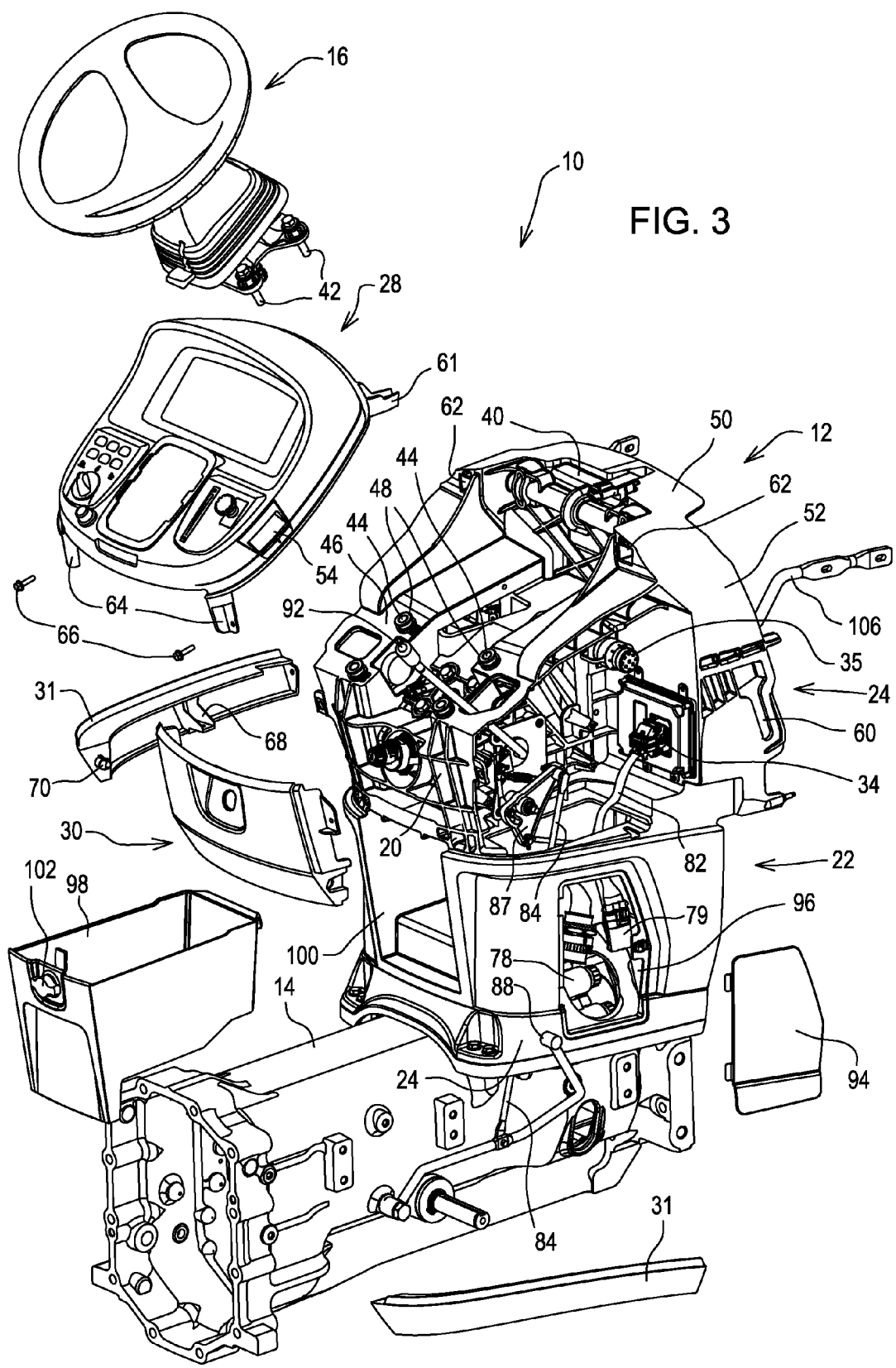
FIG. 3 is an exploded right front perspective view of the tractor center control console and transmission housing according to a first embodiment of the invention.
Figure 5:
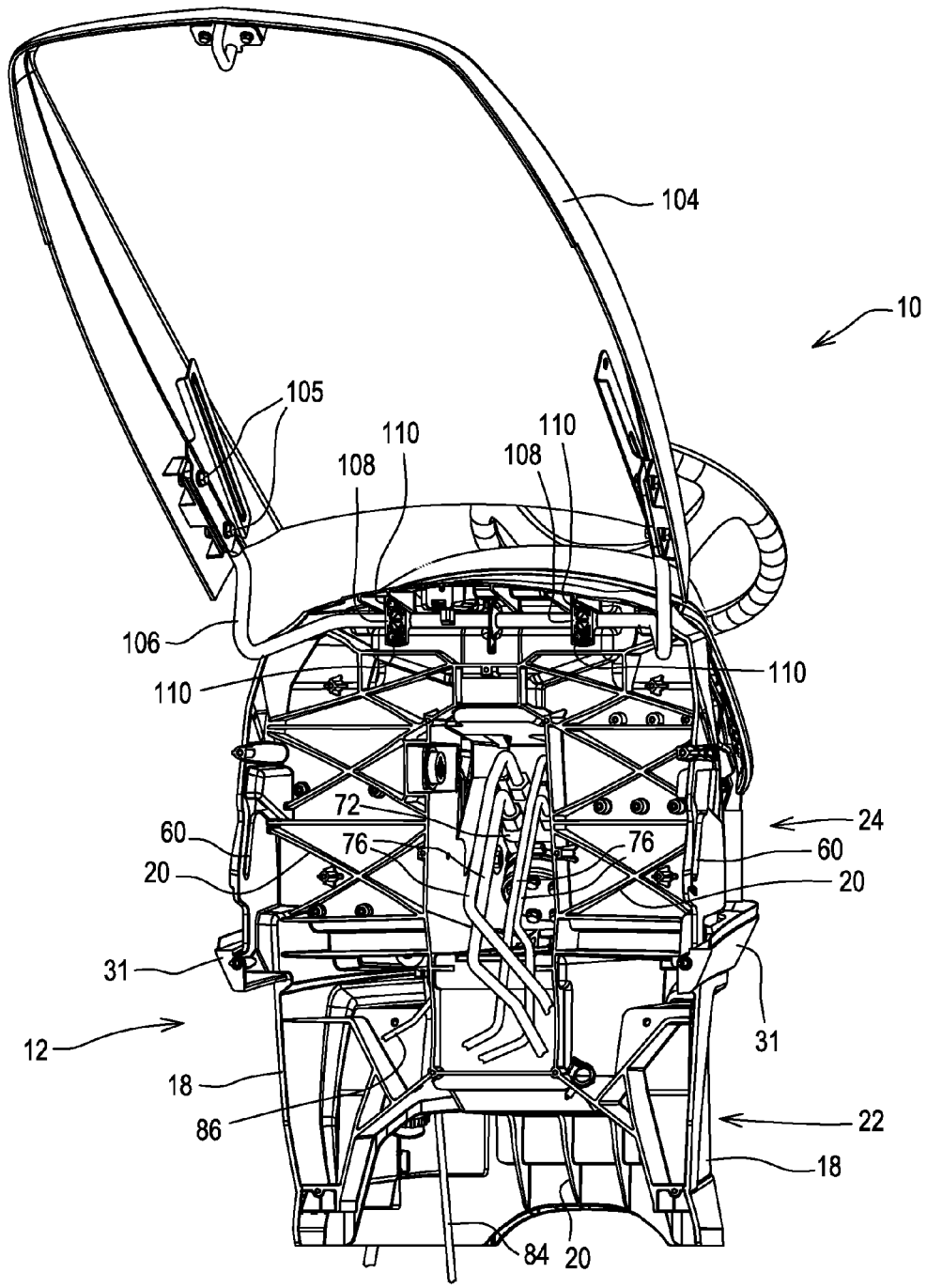
FIG. 5 is a front view of tractor center control console and tractor hood according to a first embodiment of the invention.

In one embodiment, as shown in FIGS. 3 and 4, steering column assembly 16 may be mounted to the one-piece plastic pedestal by inserting four threaded fasteners 42 through four mounting holes 44 in surface 46 on the pedestal head which may be an inclined plane of between about 30 degrees and about 60 degrees from horizontal. Rubber or plastic isolators 48 may be positioned around the threaded fasteners between the steering column assembly and the mounting holes. As shown in FIGS. 4 and 5, steering valve 72 also may be mounted to the pedestal head between steering column assembly 16 and hydraulic steering lines 76. After cowl 26 is removed, steering valve 72 may be accessed or serviced through opening or window 74 in the side of the pedestal head.

In one embodiment, the tractor center control console may include instrument panel 28, key switch panel 30 and trim panels 31. The edges of cowl 26 may engage and/or abut the side and/or upper perimeter edges of instrument panel 28, key switch panel 30 and trim panels 31. The instrument panel may be removably attached to the pedestal head using tabs 61 extending from the front or top edge of the instrument panel that engage or are captured in slots 62 near the top of the pedestal head, and tabs 64 extending from the instrument panel's lower or rear edge that may be secured to the pedestal head with threaded fasteners 66. Optionally, threaded fasteners 66 also may removably attach key switch panel 30 to the pedestal head. Trim panels 31 may be removably attached to the key switch panel and/or pedestal head using tabs 68 and/or tinnermen clips 70.

In one embodiment, the tractor center control console may include electrical and/or mechanical connectors routed through pockets in the one-piece plastic pedestal to connect between components mounted and housed in or under the one-piece pedestal. For example, FIG. 3 shows wiring harnesses 79 for the utility tractor's front and/or rear electric components extending into and through the pedestal base, and wiring harness 82 connected to transmission control unit 34. If the tractor has an electronic throttle, hand throttle 92 may be electrically connected to engine control unit 32, as shown in FIG. 2. If the tractor has a mechanical throttle, linkages such as wire forms 84, 86 may extend through pockets in the one-piece plastic pedestal between throttle bell crank 87 and foot throttle pedal 88 and/or the tractor engine, as shown in FIG. 3.

In one embodiment, the tractor center control console may include one or more removable access panels to cover openings in outer walls 18 of the pedestal base. For example, transmission service panel 94 may cover opening 96 in the outer wall on the side of the pedestal base, and may provide access to transmission components 78 and/or wiring harnesses 79 in or under the pedestal base for service. Transmission service panel 94 may be removable and/or hinged to cover opening 96. Additionally, one or more removable storage compartments may be provided in the pedestal base, such as tool box 98 which may slide into and out from opening 100 in the pedestal base, and may be closed and secured with latch 102.

In one embodiment, as shown in FIG. 5, the tractor center control console may support a hinge mechanism for tractor hood 104. The hood may be attached to the pedestal head with threaded fasteners 105 to the opposing ends of wire form 106. The intermediate portion of the wire form may be pivotably attached to the pedestal head with U-blocks 108 that are captured in molded-in features in the pedestal head, and secured with threaded fasteners 110, to provide a pivot axis for the hood hinge.

In one embodiment, the tractor center control console may be assembled before it is installed on the tractor. As assembled, the tractor center control console may include the one-piece plastic pedestal with the steering column assembly, instrument panel, key switch panel, electronic components, and hood hinge mechanism mounted thereto. The tractor center control console may be mounted as a unit onto the tractor using threaded fasteners, wiring harnesses may be attached through the base and pockets in the pedestal, steering lines may be connected to the steering valve, and the tractor hood may be attached to the hinge mechanism.

Having described the preferred embodiment, it will become apparent that various modifications can be made without departing from the scope of the invention as defined in the accompanying claims.

We claim:

1. A tractor center control console comprising:
   a one-piece plastic pedestal having a base and a head; the pedestal head having a plurality of pockets where a plurality of electronic components are mounted;
   a cowl attached to and covering the head of the pedestal and which is removable without tools to access and expose the electronic components in the internal pockets;
   an access panel in the pedestal base that is removable to provide access through the pedestal base; and
   a key switch panel removably attached to the pedestal head.

2. The tractor center control console of claim 1 further comprising a tool box removably attached to the pedestal base.

3. The tractor center control console of claim 1 further comprising a hood hinge attached to the pedestal head.

4. A tractor center control console comprising:
   a one-piece plastic pedestal having a base and a head; the pedestal head having a plurality of pockets where a plurality of electronic components are mounted;
   a cowl attached to and covering the head of the pedestal and which is removable without tools to access and expose the electronic components in the internal pockets;
   an access panel in the pedestal base that is removable to provide access through the pedestal base; and
   latches on each side of the cowl which are biased to engage an instrument panel mounted to the pedestal head.

5. The tractor center control console of claim 4 further comprising:
   a steering column assembly mounted to the one-piece plastic pedestal and solely supported by the one-piece plastic pedestal.

6. A tractor center control console comprising:
   a one-piece molded plastic pedestal mounted to a tractor and having an instrument panel attached thereto;
   a steering column assembly mounted to the one-piece plastic pedestal and solely supported by the one-piece plastic pedestal;
   a removable cowl covering at least part of the one-piece plastic pedestal; and a plurality of electronic components housed in the one-piece plastic pedestal and covered by the removable cowl; and
   slots in the left and right sides of the one-piece plastic pedestal that are engaged by fasteners on the cowl.

7. The tractor center control console of claim 6 further comprising at least one openable access panel in the one-piece plastic pedestal.

8. A tractor center control console comprising:
   a one-piece molded plastic pedestal mounted to a tractor and having an instrument panel attached thereto;
   a steering column assembly mounted to the one-piece plastic pedestal and solely supported by the one-piece plastic pedestal;
   a removable cowl covering at least part of the one-piece plastic pedestal; and
   a plurality of electronic components housed in the one-piece plastic pedestal and covered by the removable cowl;
   wherein the electronic components include an engine controller.

9. The tractor center control console of claim 8 further comprising a tool box that is slidably inserted into the one-piece plastic pedestal.

10. The tractor center control console of claim 8 further comprising:
    a transmission mounted under the pedestal; and
    a plurality of openings in and through the pedestal to access the electronic components and the transmission.

11. A tractor center control console comprising:
    a one-piece molded plastic pedestal mounted to a tractor and having an instrument panel attached thereto;
    a steering column assembly mounted to the one-piece plastic pedestal and solely supported by the one-piece plastic pedestal;
    a removable cowl covering at least part of the one-piece plastic pedestal; and a plurality of electronic components housed in the one-piece plastic pedestal and covered by the removable cowl; and
    a steering valve mounted to the one-piece plastic pedestal, and an opening through a side of the one-piece plastic pedestal to access the steering valve.

* * * * *